Nov. 15, 1927. 1,649,567

L. BRUCKMANN

CHUCK

Filed June 24, 1926

Inventor
Ludwig Bruckmann
by his attorney

Patented Nov. 15, 1927.

1,649,567

UNITED STATES PATENT OFFICE.

LUDWIG BRUCKMANN, OF PFORZHEIM, GERMANY.

CHUCK.

Application filed June 24, 1926, Serial No. 118,217, and in Germany March 8, 1926.

The present invention has reference to improvements in chucks, and it relates more particularly to a chuck device for chucking and unchucking the work piece in automatic or semi-automatic machine tools, such as for instance turret lathes and the like.

The conventional chucks in machines of this type automatically open and close for respectively releasing or clamping the work piece and generally comprise a slit steel sleeve having a conical head, which latter upon being drawn into a correspondingly recessed spindle bore clutches the work piece and securely clamps it during the work period.

Such chucks or work clamps have the drawback that their clamping capacity is relatively restricted and that the work clamping and cooperating cone faces are subjected to constant wear. These and other disadvantages are effectively obviated by my new mechanism in which the closing and opening movements of the clamping claws for respectively chucking and unchucking the work piece are adjustably controlled by means of a cam member, so that the clamping force of the device can readily be adjusted in accordance with the wear of the clamping faces. Furthermore, I use exchangeable clamping cheeks to accommodate work pieces of different diameters.

Figure 1:
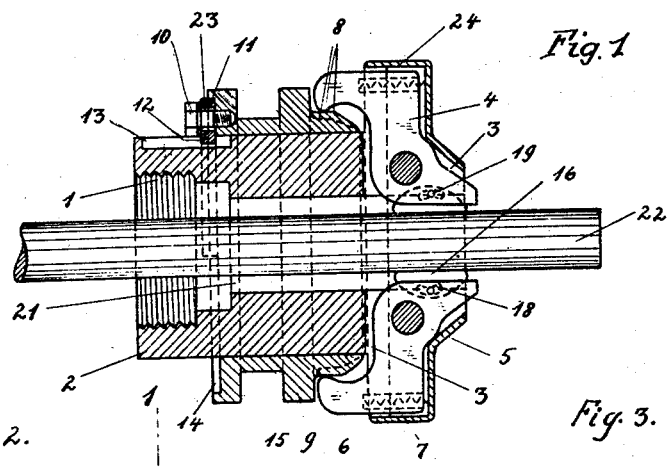
Figures 2, 3:
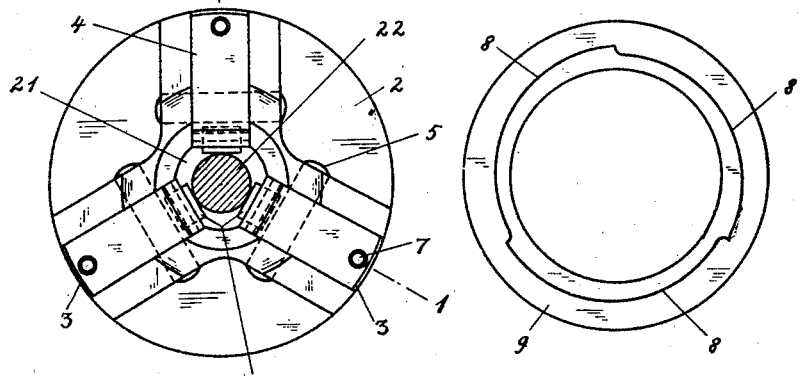
Figures 4, 5:
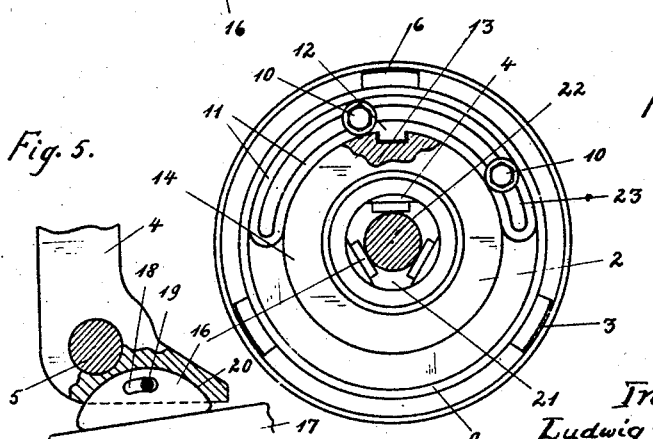

In order to make my invention more readily understood, I will now describe it in connection with the accompanying drawing, in which Fig. 1 is a longitudinal section through the new chuck taken on line 1—1 of Fig. 2, which latter figure is a front view of the device with the safety cover removed. Fig. 3 is a front view of the cam member. Fig. 4 is a rear view of the device, partly sectioned, and Fig. 5 is a fragmentary view of a clamping claw, with its clamping cheek, partly in section.

The claw supporting chuck body 2, which is provided with a thread 1 for attachment to the lathe arbor, presents in its front face a plurality of cross-slots, or grooves 3, as shown by way of example three, in each of which a rockable clamping claw 4 is pivotally mounted by a bolt 5. Each claw has a nose 6 extending rearwardly out of the respective groove 3, and a helical spring 7 urges the nose inwardly downwardly into contact with the respective cam surface 8 of the claw locking cam member 9.

According to my invention the cam faces 8 are disposed eccentrically to the longitudinal axis of the device, and they can be adjusted relative to the claws and their noses 6 and locked in the adjusted position by means of set screws 10 and the slotted segment 11. The latter is provided with an inwardly extending rib or key 12 adapted to freely engage in the slot 13 in the claw carrier body 2, which allows of the segment 11 to become displaced in axial direction but not in rotary direction relative to the carrier body 2. The segment 11 lies in an annular recess 14 of the cam member 9, which latter during the operation of the lathe can automatically be reciprocated in axial direction, for closing or opening of the chuck, the rib 12 sliding in its guide groove 13. These reciprocations of the cam member 9 may be brought about in any suitable manner well known in the art, for instance by a reciprocating power fork engaging in the annular groove 15.

On each claw 4 is mounted a clamping cheek 16 having a slot 18 through which loosely extends a pin 19 secured in the claw walls, which arrangement permits the cheek to swing about its pin to readily adapt itself to different points of attack.

According to the invention the longitudinal walls of the cheek slot 18 are arranged parallel to the clamping face of the cheek 16, so that the latter's convex face, no matter what its relative position and whether in clamping or in released state, has full contact with the correspondingly concaved bearing face 20 of the claw (Fig. 5).

In accordance with the diameter of the work piece 22, passing through the bore 21 of the chuck body 2 and a like bore in the lathe arbor, the position of the eccentric cam faces 8 can initially be adjusted relative to the noses 6 of the claws 4. For this purpose the screws 10 are loosened and the cam member 9 is rotated on the body 2 to the desired extent, the screw shanks freely sliding within the slot 23 of the segment 11, after which relative displacement the screws are tightened again, locking the member 11 in the adjusted position.

If after hard use the clamping cheeks 16 are worn, which obviously would interfere with their securely gripping the work piece, this can readily be compensated by a slight relative adjustment of the cam faces, as described.

By respectively changing the clamping cheeks 16 to smaller or larger ones, the device can readily be adapted to work pieces of greatly varying diameters.

The front face of the chuck is conveniently provided with a safety cover 24.

What I claim is:—

1. In a work clamping chuck of the type set forth, in combination with a chuck body having a central passage for the work piece, a sleeve mounted on said body for relative rotary and longitudinally reciprocatory displacement respectively, means for controlling this relative rotary displacement, a plurality of cam faces on the circumference of said sleeve, and a corresponding plurality of rockable work clamping members on said body designed to be operated by said cam faces, the operative extent of the latter being determined by the extent of the rotary displacement of said sleeve relative to said body.

2. In a work clamping chuck of the type set forth, in combination, a chuck body having a central passage for the work piece and radially directed grooves in its front face, work clamping claws rockably mounted in said body grooves, the inner clamping ends of said claws extending into the body passage, noses rearwardly extending from the outer ends of said claws, a cam annulus displaceably mounted on said body, eccentric cam faces on said annulus, one for each claw, and means for controlling the extent of the rocking movement of said claws, comprising a slotted segment adapted for longitudinal displacement only on said body, and means cooperating respectively with said cam annulus and said segment for normally rigidly connecting these two members, but allowing of their relative displacement on requirement.

3. In a work clamping chuck of the type set forth, a chuck body having a central passage for the work piece and presenting radially directed grooves in its front face, clamping claws rockably mounted in said grooves with their inner clamping ends extending into the body passage, noses extending rearwardly from the outer ends of said claws, a cam annulus mounted on said body for longitudinal reciprocation and rotary displacement, a slotted segment and screw bolt connection as means for allowing relative displacement between said annulus and said body and for normally locking these two parts to one another, cam faces on said annulus, one for each claw, and means for urging said claw noses into operative contact with their respective cam faces.

In testimony whereof I affix my signature.

LUDWIG BRUCKMANN.